(12) United States Patent
Lin

(10) Patent No.: US 6,609,275 B1
(45) Date of Patent: Aug. 26, 2003

(54) STRAP TIGHTENER WITH AN AUTO-PULLING DEVICE

(76) Inventor: Chia-Sheng Lin, No. 114, Sec. 1, Yung-Po Rd., Pun-Hsin Hsiang, Changhua Hsien (TW)

( * ) Notice: Subject to any disclaimer, the term of this patent is extended or adjusted under 35 U.S.C. 154(b) by 0 days.

(21) Appl. No.: 10/062,763

(22) Filed: Feb. 5, 2002

(51) Int. Cl.[7] .................. A44B 21/00; B25B 25/00; B60P 7/08; B65H 75/28
(52) U.S. Cl. .................. 24/68 CD; 24/68 CT; 24/68 ST; 24/909; 242/373; 410/105; 410/110
(58) Field of Search .................. 24/68 CD, 68 CT, 24/68 ST, 909; 410/105, 110; 242/373

(56) References Cited

U.S. PATENT DOCUMENTS

| | | | | |
|---|---|---|---|---|
| 2,656,991 A | * | 10/1953 | Neely | 242/373 |
| 4,622,721 A | * | 11/1986 | Smetz et al. | 24/68 CD |
| 5,560,086 A | * | 10/1996 | Huang | 24/68 CD |
| 5,611,520 A | * | 3/1997 | Soderstrom | 24/68 CD |
| 5,894,638 A | * | 4/1999 | Huang | 24/68 CD |
| 6,019,304 A | * | 2/2000 | Skowronski et al. | 242/373 |
| 6,059,499 A | * | 5/2000 | Bird | 410/110 |
| 6,102,371 A | * | 8/2000 | Wyers | 24/68 CD |

* cited by examiner

*Primary Examiner*—Victor Sakran
(74) *Attorney, Agent, or Firm*—Harrison & Egbert

(57) ABSTRACT

A strap tightener has an auto-pulling device connected to a seat. The auto-pulling device includes a housing and a reversing device. The reversing device is rotatably received in the housing. The reversing device has a reel received in the housing to connect with one end of a strap. A spiral power spring is connected between the housing and the reel. Consequently, the strap can be automatically wound around the reel after the strap tightener is used. To collect the strap is convenient and the operating time of collecting the strap is saved.

6 Claims, 6 Drawing Sheets

STRAP TIGHTENER WITH AN AUTO-PULLING DEVICE

BACKGROUND OF THE INVENTION

1. Field of the Invention

The present invention relates to a strap tightener, and more particularly to a strap tightener with an auto-pulling device.

2. Description of Related Art

With reference to FIGS. 4 and 5, a conventional strap tightener in accordance with the prior art is mounted on a base plate (50) and comprises a U-shaped seat (60), a lever (70) and a ratchet device. The U-shaped seat (60) is securely attached to the base plate (50). The lever (70) is pivotally mounted on the seat (60) with a shaft (80). The ratchet device is mounted between the lever (70) and the seat (60).

The base plate (50) has a distal edge and a proximal edge parallel to each other. The distal edge of the base plate (50) is bent to form a hook (500). A slot (52) with two ends is defined in the base plate (50) near and parallel to the proximal edge. Two ears (51) extend perpendicular from the base plate (50) in a direction opposite to the hook (500) and near the distal edge of the base plate (50). The ends of the slot (52) respectively correspond to the ears (51). Each ear (51) has a through hole (511) defined to align with the through hole (511) in the other ear (51). A bore (53) is defined in the base plate (50) between the pair of ears (51) and the slot (52).

The seat (60) includes two wing plates (600) parallel to each other. The wing plates (600) are oriented perpendicular to the proximal and distal edges of the base plate (50). Each wing plate (600) has a first end near the distal edge of the base plate (50) and a second end near the proximal edge of the base plate (50). The wing plates (600) are connected by a bridge (601). A retaining plate (602) extends upward from one side of the bridge (601) near the pair of ears (51), and a hole (604) is defined in the retaining plate (602). A through hole (61) is defined in the first end of each respective wing plate (600) to correspond to the through holes (511) in the ears (51). A through hole (603) is defined in the bridge (601) and corresponds to the bore (53) in the base plate (50). A bolt (not numbered) extends through the bore (53) in the base plate (50) and the through hole (603) in the bridge (601) to screw with a nut (not numbered). A pivot hole (62) is defined in the second end of each respective wing plate (600), and a stop (63) radially extends from the second end of each respective wing plate (600). A slot (631) is defined near the middle portion of the stop (63). A guide slot (64) is defined in each respective wing plate (600) between the through hole (61) and the pivot hole (62). Each guide slot (64) is aligned with a radius of the pivot hole (62) in the corresponding one of the wing plates (600). A brake pawl (65) has two opposite sides respectively sliding in the guide slots (64) and a stub (651) extending through the hole (604) in the retaining plate (602). A spring (652) is mounted around the stub (651) of the brake pawl (65) and between the brake pawl (65) and the retaining plate (602) to push the brake pawl (65) toward the pivot hole (62).

The lever (70) has a distal end and a proximal end and includes two side plates (71) perpendicular to and integrally formed with a connecting plate (72) at the distal end. The distance between the two side plates (71) is greater than that between the two wing plates (600), such that a gap is defined between the each side plate (71) and the corresponding wing plate (600). A pivot hole (not shown) is defined in a proximal end of the side plates (71) and corresponds to the pivot hole (62) in the seat (60). The diameter of the pivot hole in the lever (702) is the same as that of the pivot hole (62) in the seat (60). A cam (73) extends from the proximal end of the side plate (71) to push the brake pawl (65). A guide slot (711) is defined in each side plate (71) and is aligned with the center of the pivot hole in the side plate (71) in which the guide slot (711) is defined. A retaining plate (74) extends perpendicular from the connecting plate (72) and has a through hole (741) defined in the retaining plate (74).

A connecting pawl (75) has two opposite sides respectively sliding in the guide slots (711) and a stub (751) extending through the hole (741) in the retaining plate (74). A spring (752) is mounted around the stub (751) of the connecting pawl (75) and between the connecting pawl (75) and the retaining plate (74) to push the connecting pawl (75) toward the proximal end of the lever (70).

The ratchet device comprises two ratchet wheels (81). The ratchet wheels (81) are respectively mounted in the gaps between the side plates (71) and the wing plates (600). Each ratchet wheel (81) includes multiple teeth each having a sliding side and a limiting side. Each side of the brake pawl (65) engages with the limiting side of one of the teeth of the corresponding ratchet wheel (81), and each side of the connecting pawl (75) engages with the limiting side of the other one of the teeth of the corresponding ratchet wheel (81). Consequently, the ratchet wheels will rotate with the lever by means of the abutment of the connecting pawl (75) and the corresponding tooth on the ratchet wheel (81). In addition, the ratchet wheel (81) rotates only in one direction due to the limitations of the limiting sides of the teeth.

The shaft (80) extends through the pivot hole in the lever (70), the pivot hole (62) in the wing plate (600) and the two ratchet wheels (81) to connect the lever (70) and the two ratchet wheels (81) to the seat (60). The shaft (80) includes two half-round bars (801), and each of the ratchet wheels (81) has two half-round holes (not shown) for corresponding to each other and allowing the half-round bars (801) to extend through corresponding half-round holes. Thus, a slit is defined between the half-round bars (801) of the shaft. Consequently, when the lever (70) is rotated, the shaft (80) is rotated with the lever (70) by means of the transmission of the ratchet wheels (81). A locking hole (802) is defined in each respective end of the shaft (80) to securely receive a locking pin (82) so as to keep the shaft (80) from detaching from the seat (60) and the lever (70).

A strap (100) passes through the slot (52). The strap (100) has a first end connected to the slit in the shaft (80) and a second end with a hook or a loop. The strap (100) near the first end thereof is wound around the shaft (80).

To operate the conventional tightener, the hook (500) on the base plate (50) is hooked on a transportation vehicle. The strap (100) can be reeled off from the shaft (80) after the connecting pawl (75) is released from the ratchet wheels (81) by means of sliding the connecting pawl (75) relative to the lever (70). The hook or the loop on the second end of the strap (100) is hooked on the transportation vehicle after the strap (100) has been looped around an object on the transportation vehicle. When the lever (70) is rotated after the connecting pawl (75) is engaged with the ratchet wheels (81), the shaft (80) will rotate with the lever by means of the transmission of the ratchet wheels (81). The strap (100) will be wound round the shaft a number of turns as the shaft is rotated, thus the strap (100) is tightened. This can securely hold the object in place on the transportation vehicle.

However, to retrieve the strap (100) from around the shaft (80) after the strap tightener has been used, the user must continually rock the lever (70) to drive the shaft (80) to roll and to wind the strap (100). The retrieval of the strap (100) for its storage is considered by the professional as a time-wasting and irritating procedure.

With reference to FIG. 6, another conventional strap tightener in accordance with the prior art comprises an arm (90) and a lever (91). The lever (91) is pivotally attached to the arm (90) with a first shaft (92). A slit is defined in the first shaft (92) to introduce one end of a first strap (95). The shaft (92) is rotatable with the lever (91) to tighten the first strap (95). A ratchet device (not shown) is co-axially mounted on the first shaft (92) to rotate the shaft (92) and to tighten the strap (95) in cooperation with the lever (91). A second shaft (93) with a slit is rotatably mounted on the arm (90) for one end of the first strap (95) to connect to the second shaft (93). A hook is attached to the other end of the first strap (95). A knob (94) is co-axially attached to the second shaft (93). A second strap (96) with a hook is attached to the arm (90). Consequently, the strap tightener can hold an object in position by means of the straps (95,96).

Although the user can collect the first strap (95) by means of rotating the knob (94) after the tightener is used, the manual way to collect the first strap (92) is also troublesome and time-wasting.

The present invention has arisen to mitigate or obviate the disadvantages of the conventional strap tightener.

SUMMARY OF THE INVENTION

The main objective of the present invention is to provide an improved strap tightener that has an auto-pulling device for retaining the superfluous portion of the strap.

To achieve the objective, a strap tightener has an auto-pulling device connected to a U-shaped seat. The auto-pulling device includes a housing and a reversing device. The reversing device is rotatably received in the receiving space in the housing. The reversing device has a reel and a spiral power spring. The reel is rotatably mounted in the housing for one end of the strap to be wound around the reel. The spiral power spring is received in the housing and has a first end secured on the housing and a second end secured on an inner periphery of the reel. Consequently, the strap will be automatically wound around the reel after the strap tightener has been used by means of the restitution force provided by the spiral power spring.

Further benefits and advantages of the present invention will become apparent after a careful reading of the detailed description with appropriate reference to the accompanying drawings.

DETAILED DESCRIPTION OF THE INVENTION

Figure 1:
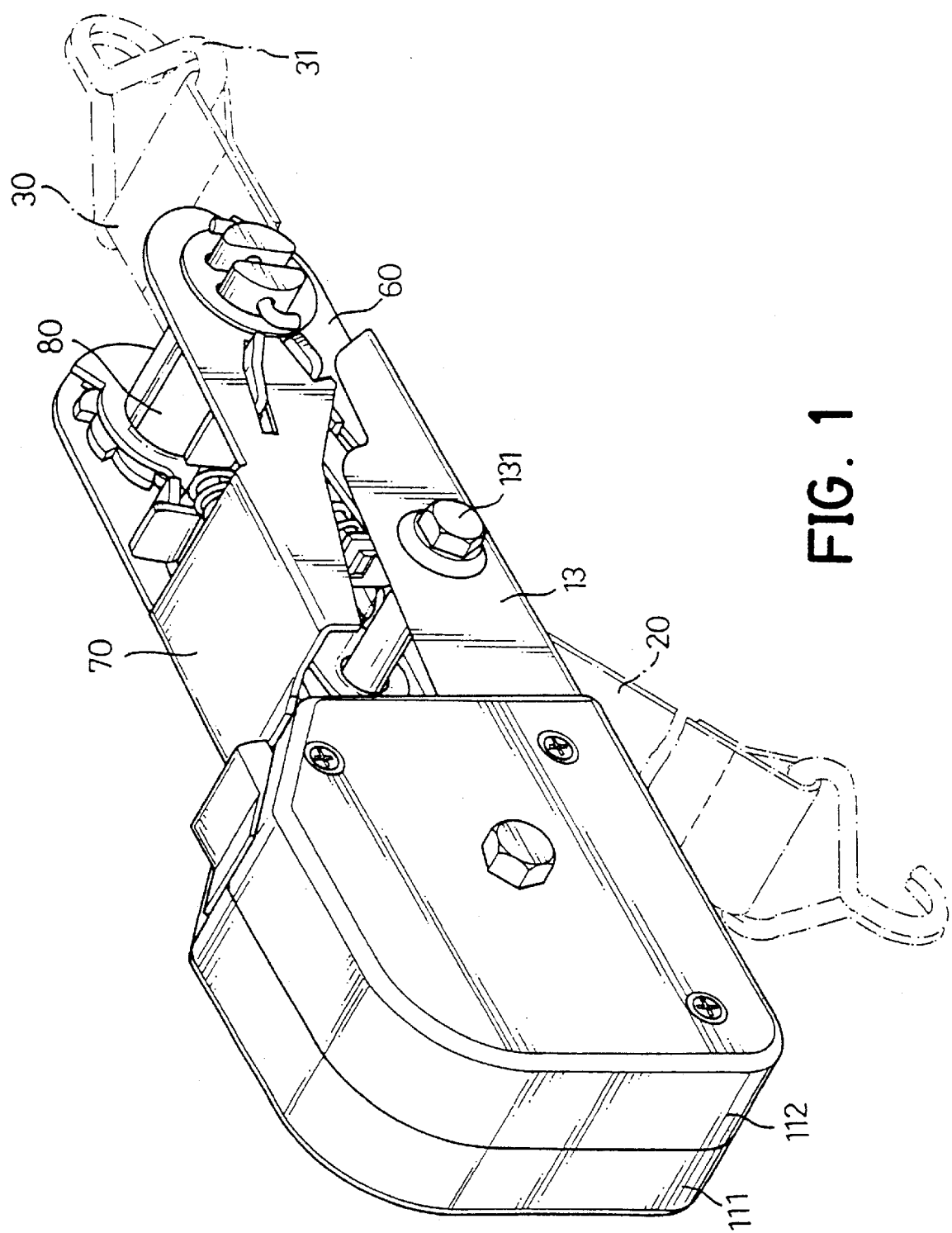
FIG. 1 is a perspective view of a strap tightener with an auto-pull device in accordance with the present invention.
Figure 2:
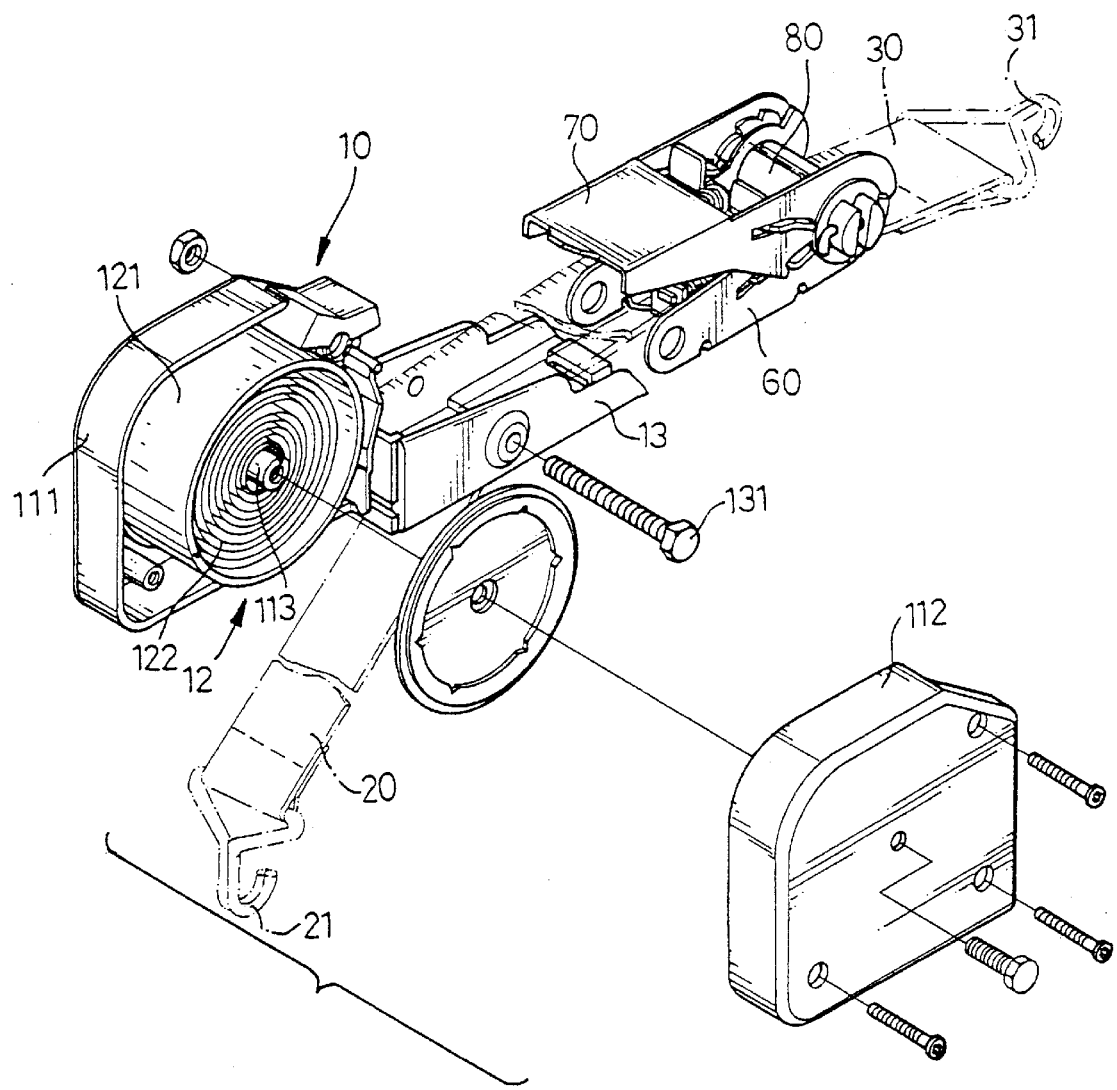
FIG. 2 is an exploded perspective view of the strap tightener in FIG. 1.
Figure 3:
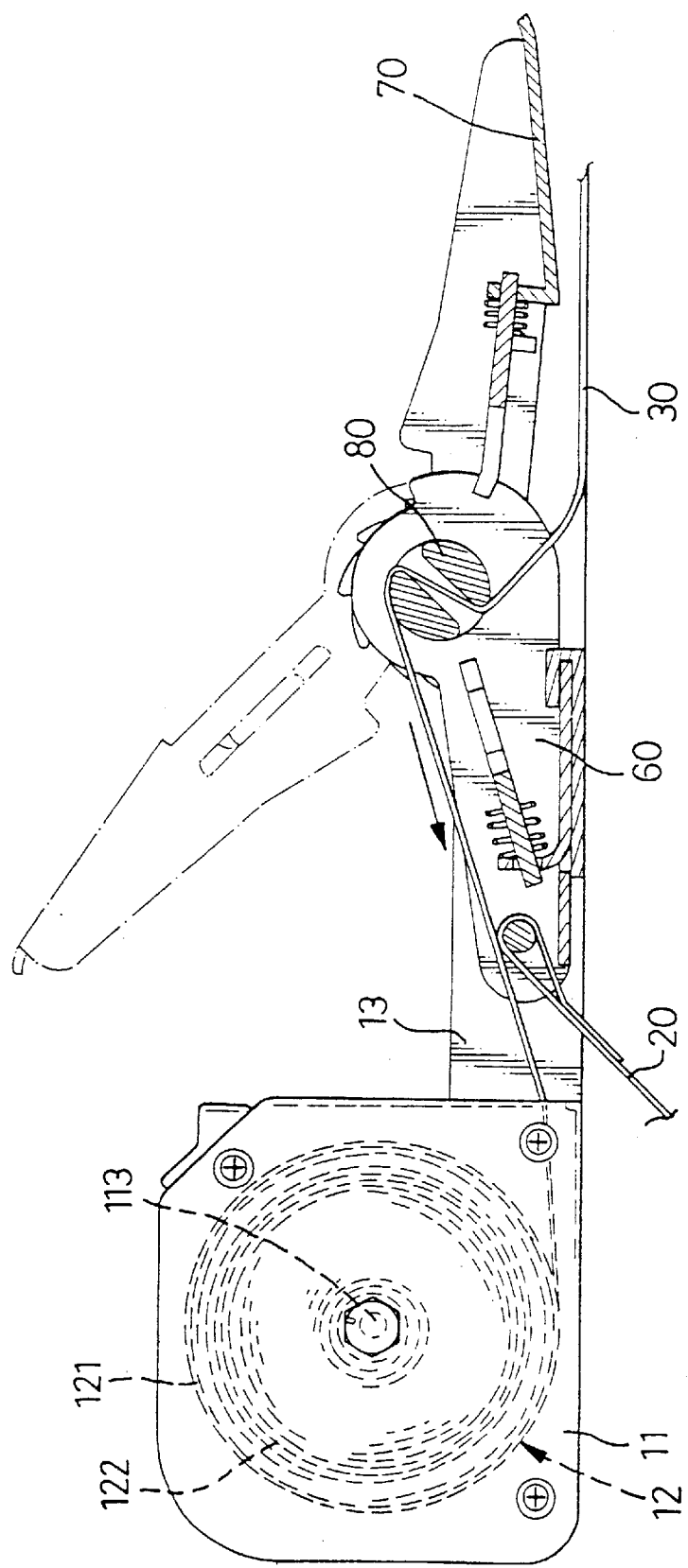
FIG. 3 is an operational side plan view of the strap tightener in FIG. 1.
Figure 4:
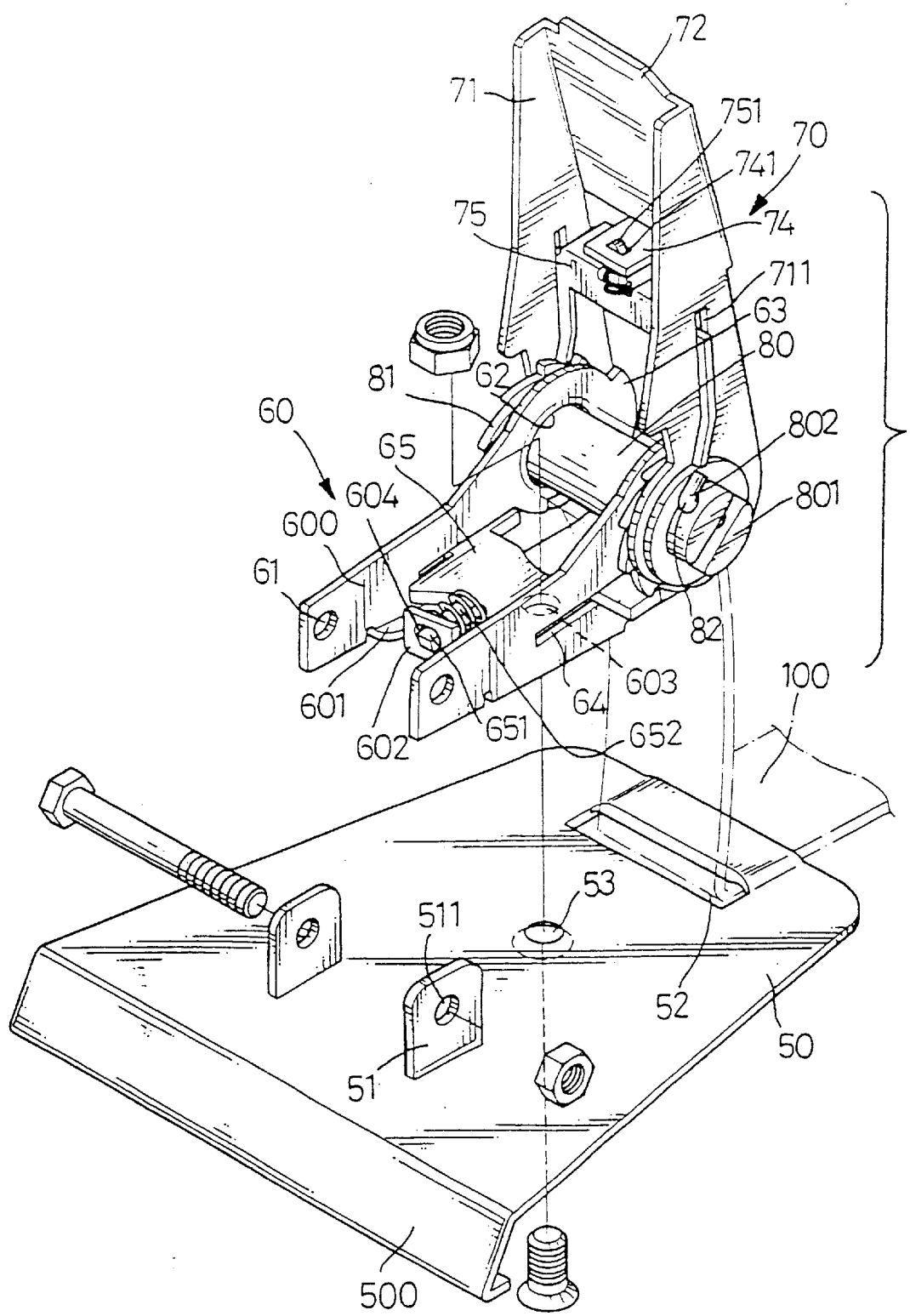
FIG. 4 is an exploded perspective of a first embodiment of a conventional strap tightener in accordance with the prior art.
Figure 5:
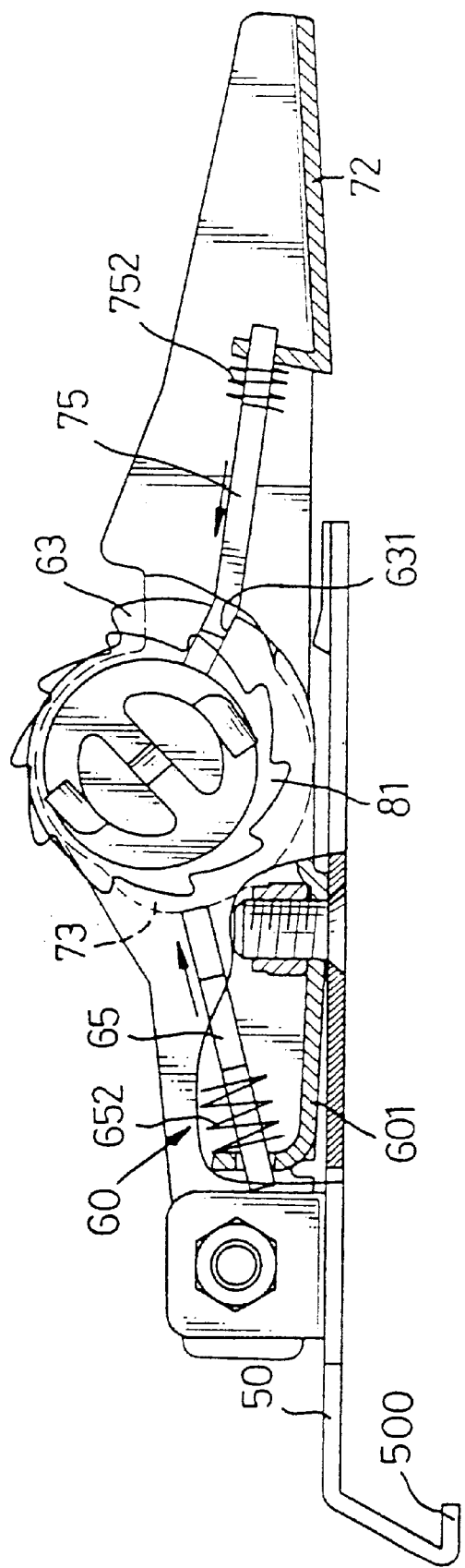
FIG. 5 is a side plan view in partial section of the convention strap tightener in FIG. 4.
Figure 6:
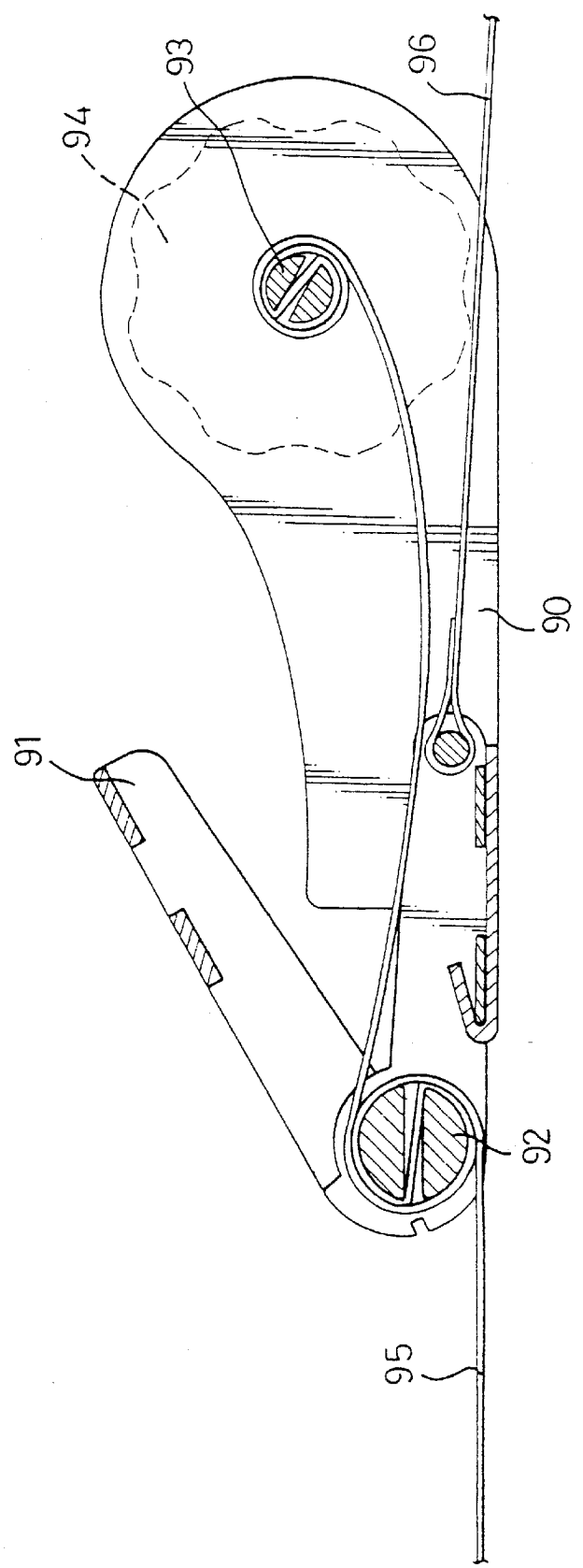
FIG. 6 is a cross sectional side plan view of a second embodiment of a conventional strap tightener in accordance with the prior art.

With reference to the drawings and initially to FIGS. 1 to 3, a strap tightener with an auto-pull device (10) in accordance with the present invention comprises a U-shaped seat (60), a lever (70), a ratchet device and an auto-pull device. The U-shaped seat (60) is connected to the auto-pull device (10) by a bolt (131). The lever (70) is pivotally mounted on the U-shaped seat (60) by a rotatable shaft (80) and the ratchet device is mounted between the lever (70) and the U-shaped seat (60). The structures of the seat (60), the lever (70) the shaft (80) and the ratchet device are substantially same as those of the prior art.

The auto-pulling device (10) comprises a housing (11) and a reversing member (12). The housing (11) is connected to the U-shaped seat (60). In practice, a U-shaped connector (13) is attached to the housing (11) to connect the housing (11) to the U-shaped seat (60). The housing (11) includes a base member (111) and a cover (112) attached to the base member (111) to form a receiving space. The base member (111) has a rod (113) centrally and perpendicularly extending from a bottom of the base member (111).

The reversing device (12) is received in the receiving space in the housing (11). The reversing device has an annular reel (121) and a spiral power spring (122). The reel (121) is rotatably received in the receiving space in the housing (11) and encloses the rod (113). The spiral power spring (122) is received in the reel (121) and is mounted around the rod (113). The spring (122) has a first end securely attached to the rod (113) and a second end securely attached to the inner periphery of the reel (121).

The strap tightener further comprises a first strap (30) and a second strap (20). The first strap (30) has a first end and a second end. The first end of the first strap (30) extends through a slit defined in the shaft (80) and a slot defined in the housing (11) and is secured on the outer periphery of the reel (121). A first fastening device (31) such a hook is secured to on the second end of the second strap (30) for being secured on a transportation vehicle after looping around an object on the transportation vehicle. The second strap (20) includes a first end connected to the bottom of the U-shaped connector (13) and a second end with a second hook (21) mounted to the first strap (20). The second hook (21) is adapted to be secured on the transportation vehicle.

To operate the strap tightener, when the second strap (30) is reeled out from the reel (121) after releasing the lever (70) from the ratchet device, the reel (121) will be rotated and the spiral power spring (122) will be tightened. Thus, a restitution force will occur in the tightened spring (122). The second strap (30) will be tightened by means of rocking the lever (70) after the lever engages with the ratchet device. The object can be held by means of cooperation of the straps (20,30).

To collect the strap (30) after the strap tightener has been used, the second strap (30) will be automatically wound around the reel (121) due to the restitution force of the spiral power spring (122) after releasing the lever (70) from the ratchet device. Consequently, to collect the strap (30) of the strap tightener is convenient and the operating time is saved.

Although the invention has been explained in relation to its preferred embodiment, it is to be understood that many other possible modifications and variations can be made without departing from the spirit and scope of the invention as hereinafter claimed.

What is claimed is:

1. A strap tightener apparatus comprising:

a seat;

a lever pivotally mounted to said seat by a rotatable shaft, said rotatable shaft having a slot extending therethrough, said lever pivotally movable between a first position and a second position;

a ratchet means mounted to said lever and to said seat, said ratchet means for selectively allowing said rotatable shaft to rotate only in a single direction; and an auto-pulling device attached to said seat, said auto-pulling device comprising:

a housing connected to said seat, said housing having a slot formed therein;

a reversing means rotatably received in said housing, said reversing means comprising and annular reel received in said housing and a spiral power spring received in said reel, said power spring having a first end securely attached to said housing and a second end securely attached to an inner periphery of said reel;

a first strap extending through said slot in said shaft of said lever and through said slot of said housing, said first strap having a first end wound around said reel and a second end extending outwardly of said seat, said second end having a first fastener affixed thereto, said reversing means for retracting said first strap when said lever is rotatably moved inwardly from said second position to said first position; and a second fastener mounted to said seat.

2. The apparatus of claim 1, said housing comprising:

a base member having a rod centrally and perpendicularly extending from a bottom of said base member; and a cover attached to said base member, said cover defining a receiving space between said base member and said cover.

3. The apparatus of claim 2, said reel being mounted around said rod of said base member, said power spring having a first end securely attached to said rod.

4. The apparatus of claim 1, said auto-pulling device further comprising:

a U-shaped connector mounted between said housing and said seat so ast o said housing to said seat.

5. The apparatus of claim 1, said first fastener being a hook.

6. The apparatus of claim 1, said second fastener comprising:

a second strap attached to said seat; and a hook attached to said second strap.

* * * * *